Re. 24563

United States Patent Office 2,820,018
Patented Jan. 14, 1958

2,820,018

BUTADIENE ACRYLONITRILE COPOLYMER SOFTENED WITH LIQUID ALKYLACRYLATE-ACRYLONITRILE COPOLYMER PREPARED IN THE PRESENCE OF A POLYHALOMETHANE CHAIN TERMINATING AGENT

Howard K. Nason, St. Louis, Mo., assignor to Monsanto Chemical Company, St. Louis, Mo., a corporation of Delaware No Drawing. Application December 27, 1955
Serial No. 555,227

3 Claims. (Cl. 260—31.8)

This invention relates to the softening or plasticizing of synthetic rubber-like substances and is particularly concerned with copolymers of 1,3-butadiene and acrylonitrile.

The copolymers of butadiene-1,3 and acrylonitrile are resistant to oils and solvents, consequently these rubber-like substances find use where such property is essential. By the same token they are resistant to the ordinary type plasticizers and being tough and hard, cannot be satisfactorily processed on rubber mills or Banbury mixers without suitable processing aids. Another shortcoming, since the vulcanized products are generally used in contact with fuels, oils or other solvent materials, is that the plasticizer is often leached out and lost, thereby contaminating the fluid and detracting from the rubbery properties of the copolymer.

A primary object of this invention is to provide a new class of softeners or plasticizers compatible with rubbery copolymers of butadiene-1,3 and acrylonitrile. A further object is to provide a class of materials which render the copolymers soft and easily processed so that the addition of compounding and curing agents is facilitated. A still further object is to provide a class of softeners which enable the preparation of vulcanizates having desirable modulus and tensile properties. A further particular object of the invention is to provide a class of plasticizers which resist extraction from the butadiene-1,3-acrylonitrile copolymers.

It has now been found that these and other objects are achieved by incorporating liquid addition polymers of alkyl acrylates and certain chain terminating agents into rubbery copolymers of butadiene-1,3 and acrylonitrile. More particularly, addition copolymers consisting of one molecule of a copolymer of an alkyl ester of acrylic or methacrylic acid with 10 to 50 mole percent of acrylonitrile or methacrylonitrile and one molecule of a chain terminating agent consisting of polyhalomethane disperse quickly into butadiene-1,3-acrylonitrile copolymer rubber with which they appear miscible, plasticize the rubber efficiently yet provide vulcanizates possessing high modulus and tensile properties from which the plasticizer cannot be extracted. The optimum range of acrylonitrile is 20 to 40 mole percent and it is important that it does not exceed 50.

Preferably the molecular weight of the plasticizer is not more than 10,000 and the optimum for plasticizing efficiency is apparently 4,000–6,000. Suitable acrylates include methyl, ethyl, propyl, butyl, amyl, hexyl and ethylhexyl acrylates. As the length of the alkyl chain increases the plasticizer becomes more fluid. Acrylic acid may be substituted by methacrylic acid, the effect of employing esters of the latter being to decrease the fluidity of the plasticizer.

The new plasticizers of the present invention are conveniently prepared by a controlled polymerization technique whereby the chain terminating agent is actually a significant part of the molecule, which type polymer is known as a telomer. For example carbon tetrochloride is a suitable chain terminating agent, the chlorine being attached to one end of the chain and the —CCl$_3$ group at the other. Increasing the ratio of chain terminating agent has the effect of lowering the molecular weight. For example ratios of carbon tetrachloride to total monomer of 2:1 have resulted in a plasticizer composition having a molecular weight of about 5500. With a 4:1 ratio the molecular weight was about 4500 and when a 10:1 ratio was employed the molecular weight was about 2500. Polyhalomethanes in which the halogen is chlorine or bromine such as chloroform, bromoform, bromotrichloromethane and carbon tetrabromide are desirable constituents of the plasticizer and are efficient chain terminating agents. Other chain terminating agents are useful but yield less efficient plasticizers. Examples comprise compounds having active methylene groups such as toluene, ethyl benzene, cumene and other alkyl benzenes having a labile alpha hydrogen atom; the nitro alkanes as for example 2-nitro propane, and mercaptans, examples of which are ethyl mercaptan, propyl mercaptan, butyl mercaptan, hexyl mercaptan and dodecyl mercaptan. The proportion of monomer to mercaptan should be at least 5 to 1 by weight and may be as high as 1,000 to 1. However, an excess of chain terminating agent with respect to the total monomers present is preferred in the other cases mentioned. The presence of solvents or diluents is optional.

The reactions are promoted by polymerization catalysts for which purpose agents which liberate free radicals may be employed. These include peroxygen type compounds for example, acyl peroxides such as acetyl, benzoyl, lauroyl or stearoyl peroxides; hydrocarbon peroxides and hydroperoxides such as di-tert. butyl peroxide, cumene hydroperoxide, inorganic per-compounds such as hydrogen peroxide, potassium persulfate; hydrazine derivatives such as hydrazine hydrochloride and organo-metallic compounds such as tetra ethyl lead. In addition to the methods mentioned above for controlling the molecular weight, the catalyst also exerts an influence as does the temperature of polymerization. Thus it is well known that increasing the polymerization catalyst tends to decrease the molecular weight as does increasing the temperature of polymerization. In general, the catalyst will be 0.1%–5.0% of the total monomers although quantities up to 10% may be used.

A typical example of the new plasticizing agents is prepared by charging into a suitable reaction vessel 80 parts by weight of butyl acrylate, 20 parts by weight of acrylonitrile, 400 parts by weight of carbon tetrochloride and 5% on the monomer of benzoyl peroxide. The mass is heated and stirred at refluxing temperature (85°–88° C.) for six hours and the solvent removed. The residual liquid polymer constitutes a valuable plasticizing agent as hereinafter described. It was a heavy viscous liquid, M. W. 4500, very compatible with butadiene-acrylonitrile rubber and gave stocks which extruded smoothly and swelled very little after forcing through an orifice. The sheer plasticity was very low.

Further examples of the new plasticizers are listed below. These products were prepared by copolymerizing butyl acrylate and acrylonitrile (Nos. 1 to 10 inclusive) or methacrylonitrile (Nos. 11 to 14) in the mole ratio indicated. The plasticizers are addition polymers in which the polyhalomethane is a significant part of the molecule. The polyhalomethane was carbon tetrachloride except for No. 10 where chloroform was used. Reaction was effected by heating and stirring 48 hours at 95° C. Further details of the preparation are described in copending application of Joseph E. Fields, Serial No. 258,519, filed November 27, 1951. The preparation of other addition polymers which are plasticizers is described in other applications of Joseph E. Fields as follows: Serial No. 192,335, filed October 26, 1950, now abandoned; Serial No. 327,931, filed December 24, 1952, now abandoned; Serial No. 192,336, filed October 26, 1950, now abandoned, and Serial No. 192,338, filed October 26, 1950, now abandoned.

| Mole ratio percent butyl acrylate/ acrylonitrile or methacrylonitrile | Benzoyl peroxide, percent of monomers | Chlorine, percent | Nitrogen, percent | Moles acrylate and nitrile combined per mole of polyhalomethane | M. W. |
|---|---|---|---|---|---|
| No. 1—80/20 | 2 | 2.89 | 2.95 | 33.1 | 4,907 |
| No. 2—80/20 | 5 | 3.71 | 2.58 | 32.7 | 3,823 |
| No. 3—70/30 | 2 | 2.04 | 4.52 | 66.2 | 6,952 |
| No. 4—70/30 | 5 | 2.86 | 4.17 | 46.2 | 4,959 |
| No. 5—60/40 | 2 | 2.13 | 6.02 | 67.5 | 6,658 |
| No. 6—60/20 | 5 | 2.08 | 7.03 | 72.0 | 6,818 |
| No. 7—90/10 | 5 | 3.94 | 1.30 | 28.8 | 3,599 |
| No. 8—80/20 | 5 | 3.80 | | | 3,732 |
| No. 9—80/20 | 5 | 3.52 | 2.25 | 32.0 | 4,029 |
| No. 10—80/20 | 0.005 | 1.12 | 2.86 | 84.5 | 9,497 |
| No. 11—90/10 | 5 | 1.42 | 0.99 | 80.0 | 9,987 |
| No. 12—80/20 | 5 | 2.65 | 2.14 | 44.4 | 5,352 |
| No. 13—70/30 | 5 | 1.81 | 3.81 | 70.1 | 7,835 |
| No. 14—60/40 | 5 | 1.96 | 6.21 | 70.6 | 7,236 |

In general the efficient plasticizers contain 25 to 100 moles total of ester and nitrile combined with one mole of the polyhalomethane compound.

As illustrative of the plasticizing action the adduct of carbon tetrachloride and the copolymer of 80 parts by weight of butyl acrylate and 20 parts by weight of acrylonitrile described above was incorporated in a base stock containing the butadiene-acrylonitrile copolymer known by the trade name Hycar OR-15. Similar stocks were prepared containing other addition polymers. A synthetic rubber base formula was compounded comprising:

| | Parts by weight |
|---|---|
| Hycar OR-15 | 100.0 |
| Carbon black | 60.0 |
| Zinc oxide | 5.0 |
| Stearic acid | 1.0 |
| Sulfur | 1.5 |
| 2,2'-dithiobis benzothiazole | 1.5 |

The plasticizer was added to the stock by milling in the usual manner and the plasticity of the stocks determined with several different types of plastometer. The Mooney plastometer which measures shear resistance is described by Melvin Mooney in Industrial and Engineering Chemistry, Analytical Edition, March 15, 1934, pages 147–151. The determination is carried out at 100° C., reading being taken after 4 minutes' running in accordance with A. S. T. M. D927–49T. The extrusion resistance was determined by means of a Firestone plastometer as described by J. H. Dillon in Rubber Chemistry and Technology, vol. 9, pages 496–501 (1936). The data recorded were obtained employing 10 pounds air pressure per square inch, the stocks being extruded at 82° C. after 18 minutes' preheating at 90° C. Plasticity was also determined by means of a Williams plastometer as described by Williams in Industrial and Engineering Chemistry, vol. 16, page 362 (1924)—see also Krall, ibid., page 922. The test was run in accordance with A. S. T. M. D924–47T. Samples of the stocks were preheated in a 70° oven for 18 minutes and the readings taken after 3 and 5 minutes in the plastometer at 70° F. The Williams plasticity is in reality the height of a rubber cylinder in 1/100 mm. after the upper movable plate has rested upon it for the prescribed time. The data reported are the average after 3 and 5 minutes.

| Stock | Plasticizer |
|---|---|
| A | None. |
| B | 80 butyl acrylate and 20 acrylonitrile polymerized in 2-nitropropane. |
| C | Butyl acrylate polymerized in CCl₄. |
| D | Butyl acrylate polymerized in CHCl₃. |
| E | 80 butyl acrylate and 20 acrylonitrile polymerized in CCl₄. |
| F | Butyl acrylate—polymer terminated by tert. butyl mercaptan. |
| G | Butyl acrylate—polymer terminated by tert. dodecyl mercaptan. |
| H | Butyl acrylate polymerized in toluene. |
| J | Tributoxy ethyl phosphate. |

| Plasticizer | Amt. | Mooney No. | Firestone, seconds | Williams No. |
|---|---|---|---|---|
| A | None | 130 | 200+ | 177 |
| B | 20 | 58 | 183 | 130 |
| B | 30 | 31 | 55 | 119 |
| C | 20 | 46 | 95 | 128 |
| C | 30 | 36 | 32 | 113 |
| D | 20 | 50 | 26 | 132 |
| D | 30 | 35 | 25 | 123 |
| E | 20 | 20 | 118 | 119 |
| E | 30 | 18 | 133 | 114 |
| F | 20 | 36 | 16 | 122 |
| G | 20 | 36 | 15 | 130 |
| H | 20 | 36 | 14 | 132 |
| J | 20 | 44 | 96 | 93 |

In addition the stocks so compounded were vulcanized in the usual manner by heating in a press for 60 minutes at 150° C. The resistance of the vulcanizates to solvent extraction was determined in accordance with A. S. T. M. D481–49T employing SR–6 solvent which is a hydrocarbon solvent corresponding to Reference Fuel #2 composed of 60% by volume di-isobutylene, 5% benzene, 20% toluene, 15% xylene, all of which conform to a certain standard and contains in addition 0.2 pound inhibitor per 1000 gallons of fuel. The stress-strain of the vulcanizates together with the percent weight extracted after 48 and 96 hours at 70° C. is set forth below:

| Stock | Amount, parts by wt. | Modulus at 300%, lbs./in.² | Ultimate tensile, lbs./in.² | Ultimate elongation, percent | Percent by weight extracted | |
|---|---|---|---|---|---|---|
| | | | | | 48 hrs./70° | 96 hrs./70° |
| A | None | 3,280 | 3,280 | 300 | 3.5 | 1.0 |
| B | 20 | 2,513 | 2,790 | 363 | 0.4 | 0.8 |
| B | 30 | 2,243 | 2,346 | 326 | 4.3 | 0.6 |
| C | 20 | 2,506 | 2,560 | 320 | 0.4 | 1.4 |
| C | 30 | 2,503 | 2,503 | 300 | 7.6 | 1.4 |
| D | 20 | 2,503 | 2,650 | 346 | 0.1 | 1.5 |
| D | 30 | | 1,645 | 240 | 0.2 | 2.6 |
| E | 20 | 2,940 | 3,090 | 345 | 0.3 | 0.9 |
| E | 30 | 2,735 | 2,735 | 300 | 1.1 | 0.4 |
| F | 20 | 2,376 | 2,613 | 376 | 2.2 | 2.2 |
| G | 20 | 2,430 | 2,655 | 370 | 2.1 | 1.8 |
| H | 20 | 2,320 | 2,516 | 380 | 2.1 | 1.5 |
| J | 20 | 2,280 | 2,955 | 405 | 10.1 | 9.2 |

The properties of the E stocks are outstanding. The plasticizer used in these stocks was also very compatible with natural rubber. The addition of 20 parts to 100 parts of rubber on a mill required 12 minutes as compared to 24 minutes required to mix the same amount of a liquid copolymer of 2-ethylhexylacrylate 70% and butyl acrylate 30% prepared in kerosene. The long hydrophobic group in ethylhexylacrylate would be expected to impart high compatibility with hydrocarbon rubber but even here the polyhalomethane adducts are more soluble. These adducts are also soluble in most common organic solvents including the solvent mixture used for making the solvent extraction tests described above. From the resistance to extraction of these soluble plasticizers from butadiene-acrylonitrile copolymer rubber, reaction with the rubber must be postulated.

Butadiene-1,3-acrylonitrile polymers which contain in addition other polymerized constituents such as styrene, cyanobutadiene and esters of acrylic acid may be softened or milled with the new plasticizing agents. A relatively small amount exerts appreciable activity. As little as 1 part on the rubber may be employed although better results are obtained with 10–30 parts on the rubber.

It is intended to cover all changes and modifications of the examples of the invention herein chosen for purposes of disclosure which do not constitute departures from the spirit and scope of the invention.

This application is a continuation-in-part of copending application Serial No. 263,489, filed December 26, 1951, now abandoned.

What is claimed is:

1. A vulcanized plasticized rubbery copolymer of butadiene and acrylonitrile characterized by high resistance to hydrocarbon solvents comprising butadiene-1,3-acrylonitrile copolymer rubber in admixture with a liquid plasticizer polymer having a molecular weight within the range of 2000–10,000 consisting of an addition polymer of one molecule of a copolymer of an alkyl ester of an acid selected from the group consisting of acrylic acid and methacrylic acid with 10 to 50 mole percent of a nitrile selected from the group consisting of acrylonitrile and methacrylonitrile and one molecule of a chain terminating agent consisting of polyhalomethane prepared by copolymerizing one molecular proportion of said ester with 0.1–0.5 molecular proportion of said nitrile in the presence of the said chain terminating agent the moles thereof exceeding the total moles of monomer present, the chain terminating agent containing at least three halogen atoms selected from the group consisting of chlorine and bromine.

2. A vulcanized plasticized rubbery copolymer of butadiene and acrylonitrile characterized by high resistance to hydrocarbon solvents comprising butadiene-1,3-acrylonitrile copolymer rubber in admixture with a liquid plasticizer polymer having a molecular weight within the range of 4,000–6,000 consisting of an addition polymer of one molecule of a copolymer of a lower alkyl ester of acrylic acid with 20 to 40 mole percent of acrylonitrile and one molecule of a chain terminating agent consisting of polyhalomethane prepared by copolymerizing one molecular proportion of said ester with 0.2–0.4 molecular proportion of acrylonitrile in the presence of said chain terminating agent, the moles thereof exceeding the total moles of monomer present, the chain terminating agent having at least three chlorine atoms attached to a single carbon atom.

3. A vulcanized plasticized rubbery copolymer of butadiene and acrylonitrile characterized by high resistance to hydrocarbon solvents comprising butadiene-1,3-acrylonitrile copolymer rubber in admixture with a liquid plasticizer polymer having a molecular weight within the range of 2,000–10,000 consisting of an addition polymer of one molecule of a copolymer of butylacrylate and 20 to 40 mole percent of acrylonitrile and one molecule of carbon tetrachloride prepared by copolymerizing one molecular proportion of butylacrylate with 0.2–0.4 molecular proportion of acrylonitrile in the presence of carbon tetrachloride, the moles of carbon tetrachloride exceeding the total moles of monomer.

No references cited.